United States Patent
Hollatz

(10) Patent No.: US 9,198,358 B2
(45) Date of Patent: Dec. 1, 2015

(54) CROP ENGAGING ELEMENTS FOR A COMBINE HARVESTER SEPARATING ROTOR

(75) Inventor: Brian Hollatz, Bassano del Grappa (IT)

(73) Assignee: LAVERDA SPA, Breganze (IT)

( * ) Notice: Subject to any disclaimer, the term of this patent is extended or adjusted under 35 U.S.C. 154(b) by 25 days.

(21) Appl. No.: 14/000,233

(22) PCT Filed: Feb. 6, 2012

(86) PCT No.: PCT/EP2012/051955
§ 371 (c)(1),
(2), (4) Date: Jan. 20, 2014

(87) PCT Pub. No.: WO2012/110347
PCT Pub. Date: Aug. 23, 2012

(65) Prior Publication Data
US 2014/0141849 A1    May 22, 2014

(30) Foreign Application Priority Data
Feb. 17, 2011    (GB) .................................. 1102762.0

(51) Int. Cl.
*A01F 12/00* (2006.01)
*A01F 7/02* (2006.01)
*A01F 12/22* (2006.01)

(52) U.S. Cl.
CPC .. *A01F 7/02* (2013.01); *A01F 12/22* (2013.01)

(58) Field of Classification Search
USPC .......................................... 460/71, 66, 80, 81
See application file for complete search history.

(56) References Cited

U.S. PATENT DOCUMENTS

| | | | |
|---|---|---|---|
| 4,889,517 A | 12/1989 | Strong | |
| 5,342,239 A | 8/1994 | West et al. | |
| 2007/0026913 A1 | 2/2007 | Kuchar | |
| 2008/0167100 A1 | 7/2008 | Farley et al. | |
| 2009/0042624 A1 | 2/2009 | Flickinger | |
| 2009/0143120 A1 | 6/2009 | Pope et al. | |

FOREIGN PATENT DOCUMENTS

| | | |
|---|---|---|
| CN | 101379916 A | 3/2009 |
| EP | 0522267 A2 | 1/1993 |
| EP | 2359677 A2 | 8/2011 |
| JP | 2006174710 A | 7/2006 |

OTHER PUBLICATIONS

International Search Report for International Application No. PCT/EP2012/051955 Dated Apr. 2, 2012.
UK Search Report for UK Application No. GB1102762.0 Dated Jun. 7, 2011.

*Primary Examiner* — Alicia Torres

(57) ABSTRACT

A separating rotor (32) for a combine harvester (10) is provided having a rotor core (43) and a plurality of crop engaging elements (42). Each element (42) has a finger support (50) and a finger element (58) attached to the finger support. The finger support comprises a pair of feet (52, 54) connected together by a finger attachment plate (56) wherein the finger element is attached to the finger attachment plate. Each foot is secured to the rotor core along a respective base edge (52a, 54a) which resides on both sides of an extended plane defined by the associated finger element.

11 Claims, 6 Drawing Sheets

CROP ENGAGING ELEMENTS FOR A COMBINE HARVESTER SEPARATING ROTOR

The invention relates to separating apparatus employed in combine harvesters to separate grain from straw. In particular the invention relates to axial flow separators which included at least one rotor comprising a plurality of crop engaging elements secured to a rotor core.

For many decades, self-propelled combine harvesters have been used by farmers to harvest a wide range of crops including cereals, maize and oil seed rape. Typically a combine harvester cuts the crop material, threshes the grain therefrom, separates the grain from the straw, and cleans the grain before storing in an on board tank. Straw and crop residue is ejected from the rear of the machine.

The separating apparatus is traditionally based on one of two well-established systems. In a first known system straw walkers are used to walk the crop stream rearwardly in the combine wherein agitation caused by this movement causes the grain to fall through an integrated grate whilst the straw residue falls from the rear and out of the combine. In the second alternative system cylindrical rotors are mounted within the combine longitudinally and enclosed by rotor cages wherein crop fed in at the front travels rearwardly in an axial spiral motion due to interaction between crop engaging elements fitted to the rotor core and the outside rotor cage. Separated grain falls through a grate in the cage whilst the straw residue is conveyed rearwardly and out of the machine. The invention is concerned with this second system of separating apparatus.

Stresses placed upon these crop engaging elements have been found to lead to failure in the weld between the crop engaging elements and the rotor core. Typically, the crop engaging elements are welded to the rotor core but catastrophic events, like pieces of steel passing through the rotors, cause significant damage to the rotor tube making repairs difficult and/or impractical. Therefore, in such events complete replacement of the separating rotor is required which is inconvenient and very expensive.

It is an object of the invention to provide a separating rotor which can withstand such catastrophic events without causing significant damage to the rotor core.

In accordance with the invention there is provided a separating rotor for a combine harvester comprising a rotor core, a plurality of crop engaging elements each having a finger support and a planar finger element attached to the finger support, the finger support comprising a pair of feet connected together by a finger attachment plate, the finger element being attached to the finger attachment plate, wherein each foot is secured to the rotor core along a respective base edge which resides on both sides of an extended plane defined by the associated finger element. By extending the base edge of each foot in front of the finger element, the force placed upon the rotor core surface is better distributed.

Computer modelling has shown that such a design lowers the stress placed upon the rotor core and significantly minimizes the risk of damage to the rotor core in the event of passing a piece of steel through the apparatus. Advantageously, this reduces the cost and inconvenience of replacing the entire separating rotor.

Preferably the finger element has a lower edge proximate the surface of the rotor core, said lower edge being disposed between the two feet. It should be understood that the crop material presents a rotational force upon the finger elements which increases with heavier crop streams. Advantageously any contact between the lower edge of the finger element and the rotor core surface acts against rotation of the finger element relative to the finger support.

The finger element may have a width which is substantially equal to the width of the finger attachment plate so that it is fully supported across its width. To accommodate the forwardly extending feet, the finger element may comprise a pair of cut outs along its lower edge proximate to the rotor core.

The finger element preferably includes an edge substantially normal to the plain of an associated foot (for example provided by the cut out) which abuts an upper edge of that associated foot to act against rotational movement of the finger element relative to the finger support.

Moreover, the finger element preferably includes an edge substantially parallel to a plain of an associated foot which abuts a face of that associated foot to act against rotational movement of the finger element relative to the finger support.

The profile of the finger support is such that it may be cut from a single sheet of material and bent in to shape to define the two feet and the finger attachment plate. Advantageously therefore, the invention may be provided without additional process steps to the existing finger support fabrication.

A specific embodiment of the invention will now be described with reference to the appended drawings in which:—

Figure 4:
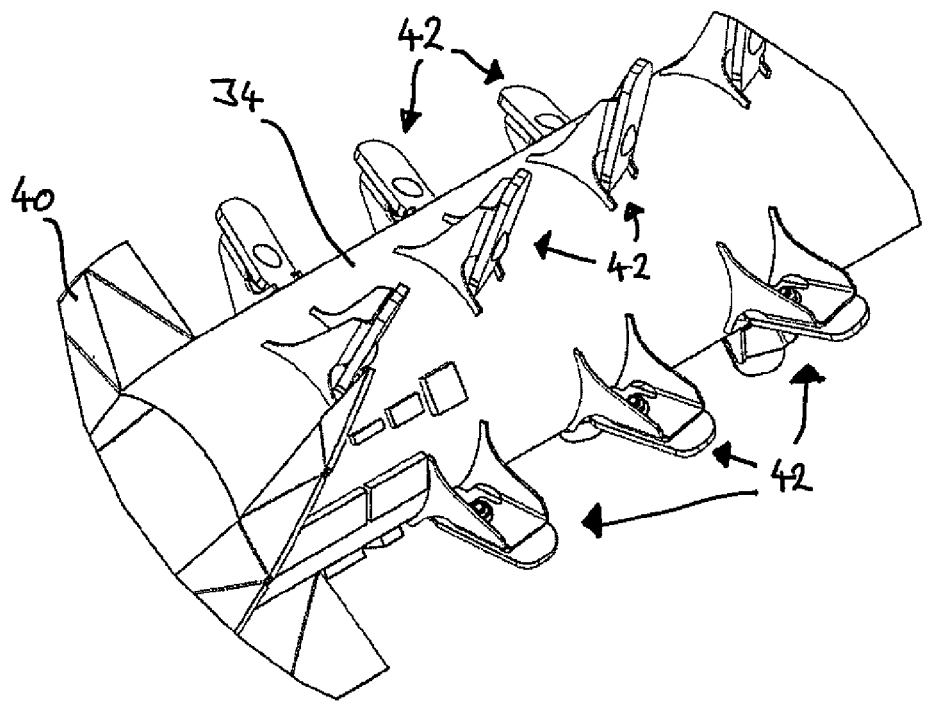
FIG. 4 is an isometric view of the separating rotor of FIG. 3 shown with the finger elements in position.
Figure 5:
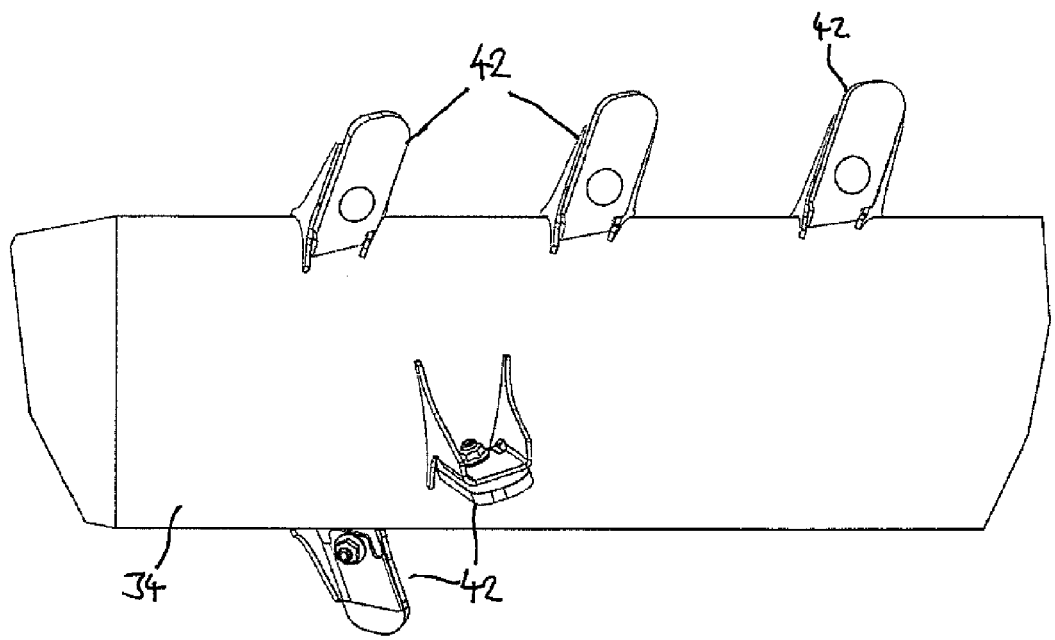
FIG. 5 is a side view of the separating rotor of FIG. 4.
Figure 6A:
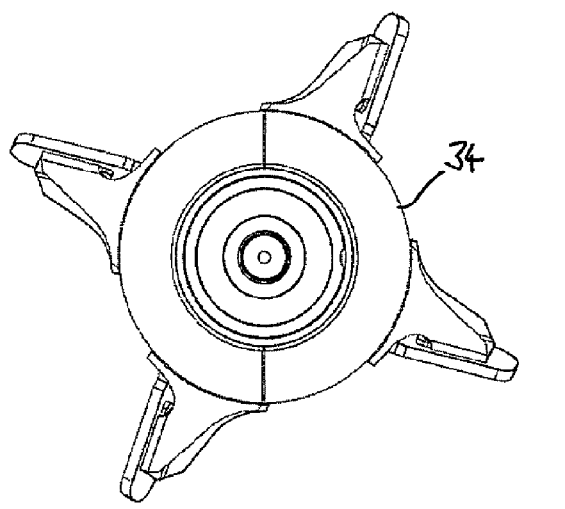
Figure 6B:
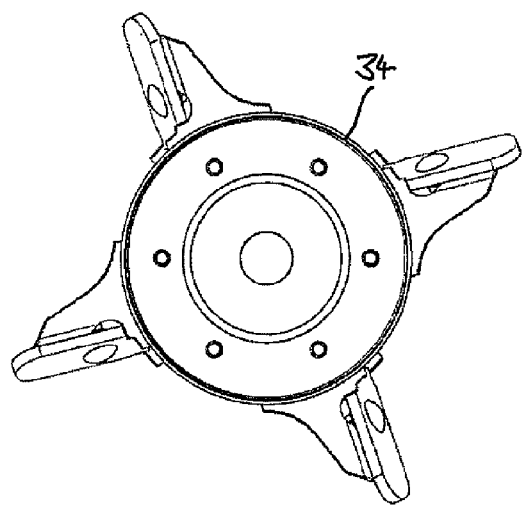
Figure 7:
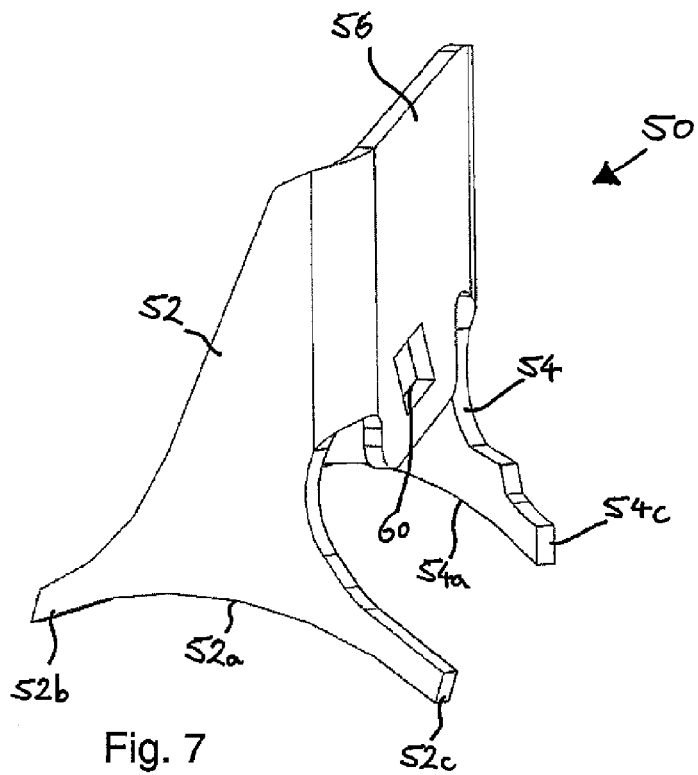
Figure 8:
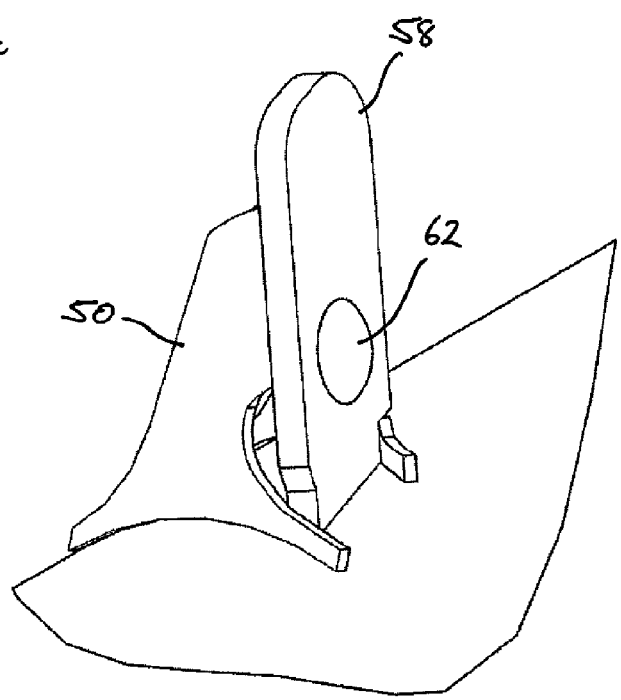
Figure 9:
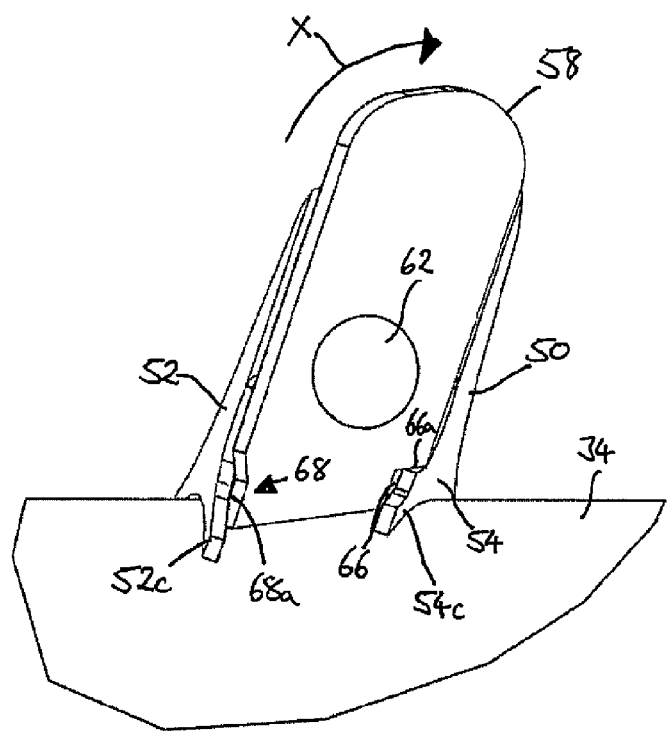
Figure 10:
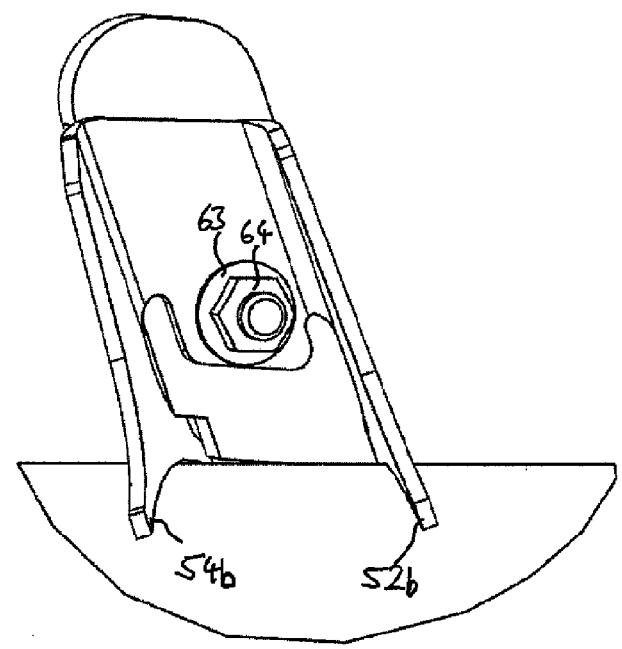

FIGS. 6*a* and 6*b* are axial views of the separating rotor of FIG. 4 viewed from the front and rear respectively;

FIG. 7 is a perspective view of a finger support in accordance with the invention; and FIGS. 8 to 10 show various views of an isolated crop engaging element in accordance with the invention.

From reading the following description it should be understood longitudinal and transverse are made in relation to the combine harvesters normal direction of travel. In other words, the term longitudinal equates to the fore and aft direction, wherein the term transverse equates to the crosswise direction, or left and right. Furthermore, axial and radial are made in relation to a rotating body such as a shaft wherein axial relates to a direction along the rotation axis and radial equates to a direction perpendicular to the rotation axis.

Figure 1:
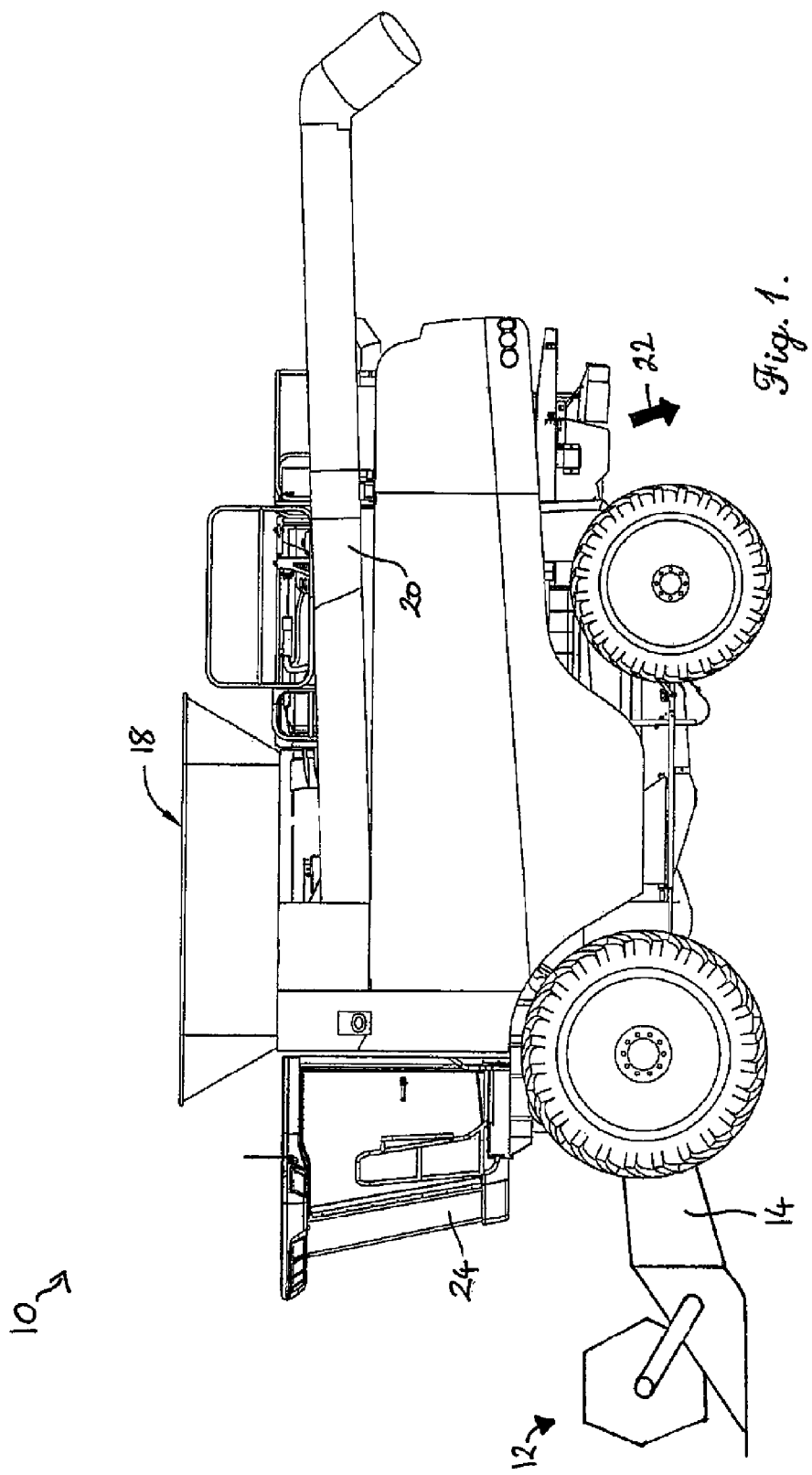
FIG. 1 is a side elevational view of a combine harvester.

With reference to FIG. 1, a self-propelled combine harvester 10 comprises a header 12 which cuts and gathers a strip of crop as the combine harvester is driven across a crop field. An elevator section 14 conveys the crop stream from the header 12 into a central processing apparatus 16 described in more detail below. Clean grain separated from the crop stream is collected in a storage tank 18 which is periodically emptied into a trailer (not shown) via an unloading auger 20. Residue material remaining from the crop stream, such as straw and chaff, is ejected from the rear of the machine represented by arrow 22. For completeness, the combine 10 includes a driver's cab 24.

Figure 2:
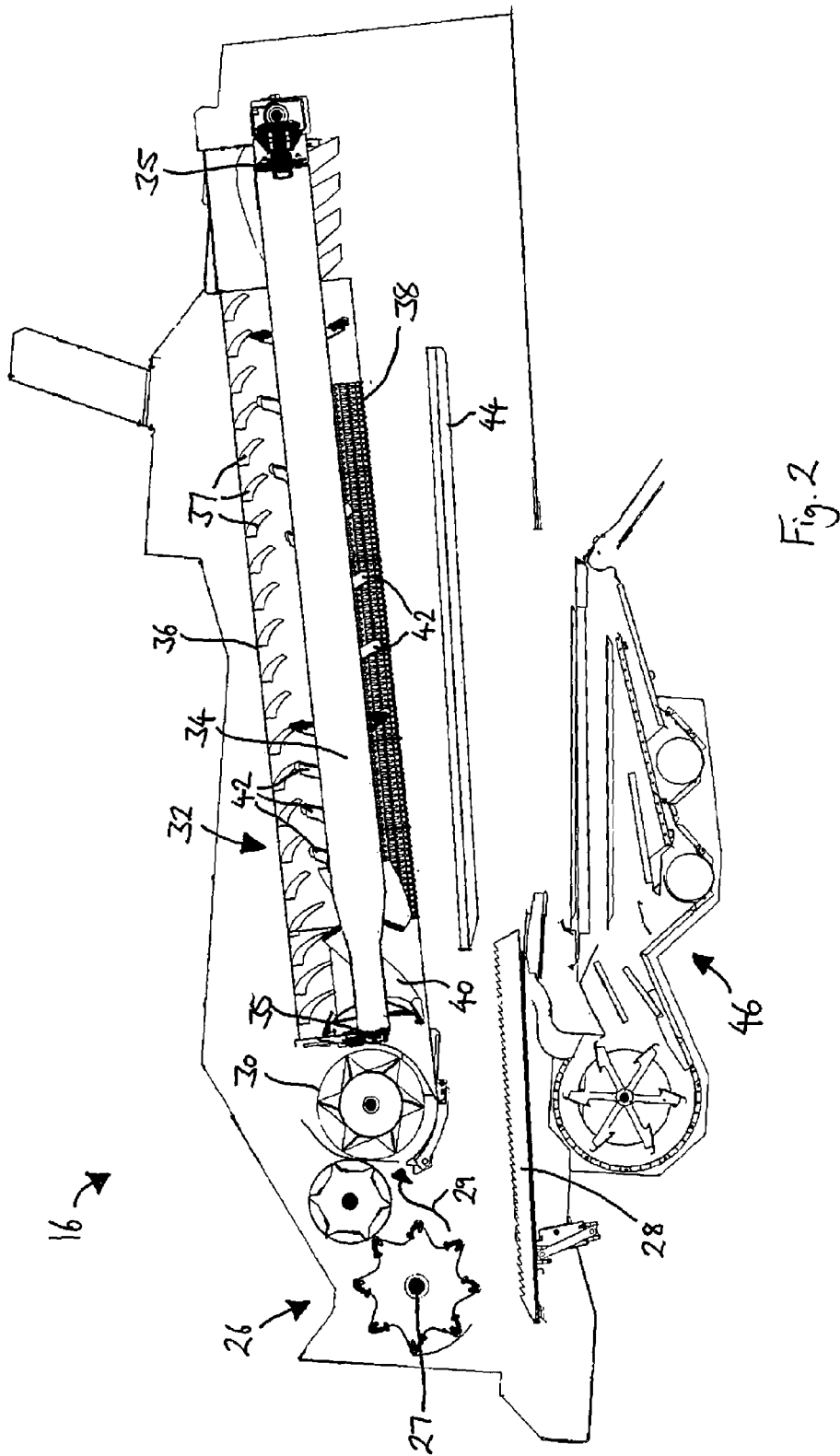
FIG. 2 is a sectional view through the crop processing apparatus of the combine harvester of FIG. 1.
Figure 3:
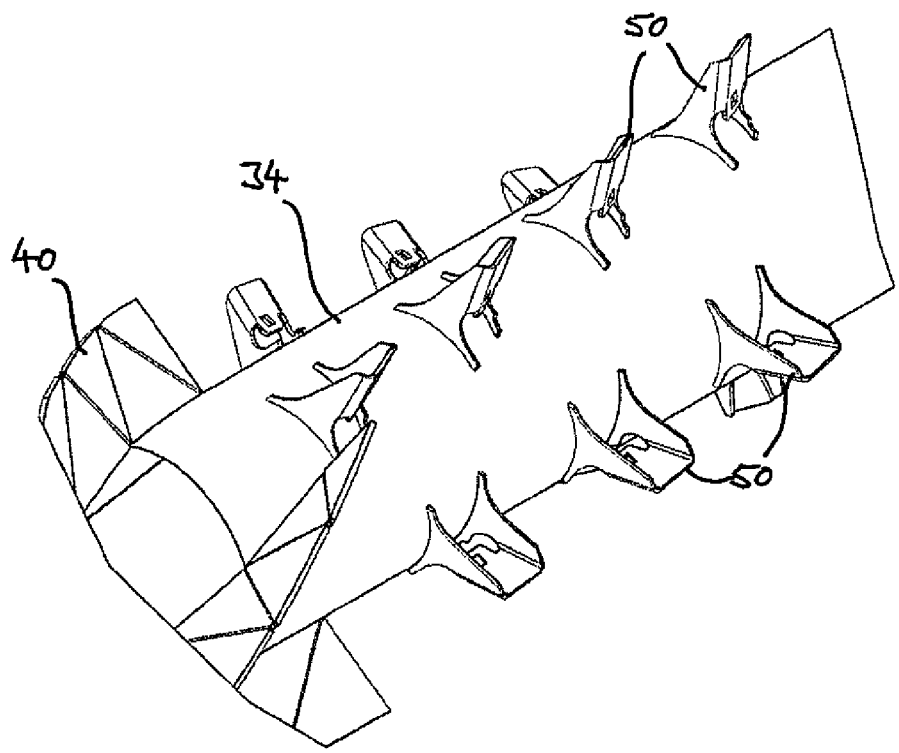
FIG. 3 is an isometric view of part of a separating rotor in accordance with the invention shown with the finger elements removed.

Turning to the details of the crop processing apparatus 16, as shown in FIG. 2, the crop stream passes from the elevator 14 into a threshing unit 26 in the form of a transverse threshing cylinder which rotates in a counter-clockwise direction as seen in FIG. 2 around a transverse axis 27. As in known combines, the crop stream is threshed between the threshing cylinder 26 and a concaved surface (not shown). Grain and chaff separated in this process fall through a grate in the concave onto an underline pan 28. The residue straw is conveyed rearwardly as represented by arrow 29 from the threshing unit to a transverse transfer beater 30 which also rotates counter-clockwise as viewed in FIG. 2. From here the crop stream is divided into two sub-streams and passed into respective longitudinally-aligned separating rotors. It will be appreciated that only one rotor 32 is shown in FIG. 2. It should also be appreciated that the invention applies to combines having only one, or even more than two, separating rotors.

The separating rotor 32 serves to separate any remaining grain from the straw. A rotor core 34 rotates on a substantially longitudinal axis supported by bearings 35. A cylindrical rotor cage 36 encloses the rotating rotor core 34 and includes an upper section which includes a series of guide veins 37 and a lower grate section 38.

At its forward, crop receiving, end rotor core 34 has flighting 40 welded thereto for rearward conveyance of the crop stream. Apart from this forward-most end, rearward conveyance of the crop stream is caused by interaction between a plurality of crop engaging elements 42 secured to the rotor core 34 and the guide veins 37. Details of the construction of the crop engaging elements is given hereinafter.

Separated grain falls through the grate 38 onto a further pan 44 which conveys the grain forwardly by an oscillating motion. The grain from both pans 28, 44 falls into a cleaning unit 46 which behaves according to known combine cleaning systems and will not be described any further.

With reference to FIGS. 3 to 6, the crop engaging elements 42 are secured to the rotor core 34 in a regular pattern as in known axial and hybrid combines to ensure a uniform conveyance of the crop stream along the length of the separating rotor 32.

Each crop engaging element includes a finger support 50 as shown in detail in FIG. 7 and is formed by cutting from a single sheet of material and bending into shape to define two feet portions 52, 54 and a finger attachment plate 56 therebetween.

Each of the feet 52, 54 comprise a lower edge 52a, 54a which is bonded to the surface of the rotor core 34, typically by welding.

The finger attachment plate 56 provides a surface upon which a planar (or flat) finger element 58 is mounted and is provided with a hole 60 to accept a bolt 62 upon which a washer 63 and nut 64 are secured thus holding the finger element 58 in place. The finger element 58 is simple in construction and is formed by cutting from a sheet of steel for example.

As in known separate rotor constructions, the extended plane defined by each finger element 58 is inclined at an angle relative to the rotational axis of the rotor core 34 so as to provide optimal conveyance of the crop stream.

Returning to the feet portions of the finger support 50, each includes a rearward extension 52b, 54b and a forward extension 52c, 54c. In essence each of these extensions forms a supporting foot. In particular, the forward extensions 52c, 54c extend beyond a plane defined by the exposed surface of the finger element 58.

In order to cater for the forward extensions 52c, 54c of the feet 52, 54 a respective cut-out is provided in the lower-most corners of the finger element 58.

With reference to FIG. 9 a first cut-out 66 includes an edge 66a which is normal to the plane of the foot 54 and abuts an upper edge of that foot to act against rotational movement of the finger element 58 relative to the finger support 50. Arrow X indicates the direction of rotation of finger element 58 caused by force from the crop stream flow. It can be seen that the tab provided by forward extension 54c provides a convenient surface upon which cut out 66 can abut.

Similarly second cut out 68 includes an edge 68a which is parallel to the plain of foot 52. Rotational movement of finger element 58 in the direction of arrow X is inhibited by edge 68 abutting the forward extension 52c of foot 52.

It should be understood that crop engaging elements 42 for the left-hand and right-hand rotors will involve a mirrored construction. The crop engaging elements 42 illustrated in FIGS. 3 to 10 are associated with the left-hand rotor.

The construction of the crop engaging elements 42 described above presents low stresses upon the rotor core 34. In a catastrophic event, such as a piece of steel passing through the rotor cage 56, impacts are absorbed by the finger support 50 rather than the surface of the separating rotor core 34 wherein significant damage can occur to the latter. Moreover, the provision of feet extending beyond the plane of the finger element provides for support against rotational movement of the finger elements 58 thereby improving the integrity of the overall construction.

The invention claimed is:

1. A separating rotor for a combine harvester comprising a rotor core, a plurality of crop engaging elements each having a finger support and a planar finger element attached to the finger support, the finger support comprising a pair of feet connected together by a finger attachment plate, the finger element being attached to the finger attachment plate, wherein each foot is secured to the rotor core along a respective base edge which resides on both sides of an extended plane defined by the associated finger element, wherein the finger element includes an edge, normal to the plane of an associated foot, which abuts an upper edge of that associated foot to act against rotational movement of the finger element relative to the finger support.

2. A separating rotor according to claim 1, wherein the finger element has a lower edge proximate the surface of the rotor core, said lower edge being disposed between the two feet.

3. A separating rotor according to claim 2, wherein the finger element has a width which is substantially equal to the width of the finger attachment plate.

4. A separating rotor according to claim 3, wherein the finger element comprises a pair of cut-outs along its lower edge, proximate to the rotor core, to accommodate the feet.

5. A separating rotor according to claim 4, wherein the finger element has a lower edge proximate the surface of the rotor core, said lower edge being disposed between the two feet.

6. A separating rotor according to claim 5, wherein the finger element has a width which is substantially equal to the width of the finger attachment plate.

7. A separating rotor according to claim 6, wherein the finger element comprises a pair of cut-outs along its lower edge, proximate to the rotor core, to accommodate the feet.

8. A separating rotor according to claim 1, wherein the finger element is bolted to the finger support.

9. A separating rotor according to claim 1, wherein the finger support is cut from a single sheet of material and bent into shape to define the two feet and the finger attachment plate.

10. A separating rotor for a combine harvester comprising a rotor core, a plurality of crop engaging elements each having a finger support and a planar finger element attached to the finger support, the finger support comprising a pair of feet connected together by a finger attachment plate, the finger element being attached to the finger attachment plate, wherein each foot is secured to the rotor core along a respective base edge which resides on both sides of an extended plane defined by the associated finger element, wherein the finger element includes an edge, parallel to the plane of an associated foot, which abuts a face of that associated foot to act against rotational movement of the finger element relative to the finger support.

11. A combine harvester comprising at least one separating rotor arranged longitudinally with respect to the normal direction of travel, the rotor comprising a rotor core, a plurality of crop engaging elements each having a finger support and a planar finger element attached to the finger support, the finger support comprising a pair of feet connected together by a finger attachment plate, the finger element being attached to the finger attachment plate, wherein each foot is secured to the rotor core along a respective base edge which resides on both sides of an extended plane defined by the associated finger element, wherein the finger element has a lower edge proximate the surface of the rotor core, said lower edge being disposed between the two feet, wherein the finger element has a width which is substantially equal to the width of the finger attachment plate, and wherein the finger element comprises a pair of cut-outs along its lower edge, proximate to the rotor core, to accommodate the feet.

* * * * *